United States Patent [19]

Yamamoto et al.

[11] Patent Number: 4,973,983

[45] Date of Patent: Nov. 27, 1990

[54] THERMAL TRANSFER RECORDING APPARATUS AND INKED FILM CASSETTE THEREFOR

[75] Inventors: Junichi Yamamoto; Yasukuni Omata; Yoshio Tohyama; Akihiko Onuma; Iwao Fujii, all of Osaka, Japan

[73] Assignee: Minolta Camera Kabushiki Kaisha, Osaka, Japan

[21] Appl. No.: 313,735

[22] Filed: Feb. 22, 1989

Related U.S. Application Data

[63] Continuation-in-part of Ser. No. 452,255, Dec. 18, 1989, which is a continuation of Ser. No. 226,143, Jul. 29, 1988, abandoned.

[30] Foreign Application Priority Data

Feb. 26, 1988 [JP] Japan .............................. 63-24937[U]

[51] Int. Cl.[5] ......................... G01D 15/10; B41J 35/28

[52] U.S. Cl. ................................ 346/76 PH; 400/120; 400/208

[58] Field of Search ................... 346/76 PH; 400/120, 400/208

[56] References Cited

U.S. PATENT DOCUMENTS

| | | | |
|---|---|---|---|
| 3,955,771 | 5/1976 | Ishii et al. | 242/71.2 |
| 4,160,605 | 7/1979 | Neubaum | 400/208 |
| 4,496,824 | 1/1985 | Kawai et al. | 219/216 |
| 4,695,173 | 9/1987 | Tomida | 400/120 |
| 4,773,775 | 9/1988 | Bradshaw et al. | 400/208 |

FOREIGN PATENT DOCUMENTS

| | | |
|---|---|---|
| 3033465 | 4/1982 | Fed. Rep. of Germany . |
| 58-50530 | 3/1983 | Japan . |
| 61-235172 | 10/1986 | Japan . |

*Primary Examiner*—Bruce A. Reynolds
*Assistant Examiner*—Gerald E. Preston
*Attorney, Agent, or Firm*—Burns, Doane, Swecker & Mathis

[57] ABSTRACT

A thermal transfer recording apparatus permitting detachable disposition therein of an inked film cassette provided with a takeup reel holding part and a supply reel holding part. In the inked film cassette, the takeup reel holding part disposed at one end thereof and the supply reel holding part disposed at the other end thereof protrude in mutually opposite directions from the cassette casing.

9 Claims, 5 Drawing Sheets

THERMAL TRANSFER RECORDING APPARATUS AND INKED FILM CASSETTE THEREFOR

BACKGROUND OF THE INVENTION

1. Field of the Invention

This invention relates to a thermal transfer apparatus for transferring an image such as a color image onto a recording paper by the use of an inked film, and more particularly to improvements in and concerning an inked film cassette for holding the inked film for use in a thermal transfer recording apparatus.

2. Description of Related Art

The thermal transfer recording apparatus is provided with a platen and a thermal head pressed fast against or moved freely from the platen and is adapted to convey between the platen and the thermal head a recording paper as positioned on the platen side and an inked film as positioned on the thermal head side. The inked film is otherwise called as thermal transfer recording medium, ink carrier, inked sheet, inked ribbon, or simply as film. Normally, it is used as held within a cassette.

Since this cassette is designed so that the inked film is wound on one end around a takeup reel and on the other end around a supply reel which are positioned as mutually separated by a prescribed distance through the medium of a thermal transfer part, it is generally provided at the opposite ends of the cassette proper or casing with a takeup reel holding part and a supply reel holding part adapted respectively to accommodate therein the takeup reel and the supply reel mentioned above.

One of the conventional inked film cassettes for use in the thermal transfer recording apparatus disclosed in Japanese Laid-Open Patent Application SHO No. 61(1986)-235,172. This cassette is designed so as to be freely attached to or detached from the thermal transfer recording apparatus. The takeup reel holding part and the supply reel holding part disposed at the opposite ends of the cassette casing are positioned on the lower side of the cassette casing. Inside the thermal transfer apparatus, the thermal head is fixed as positioned on the upper side of the cassette casing. The platen roller adapted to come into contact with this thermal head is attached to the thermal transfer recording apparatus in such a manner as to be pressed fast against or removed freely from the thermal head. The recording paper is conveyed between the inked film and the platen roller.

The thermal head is intended to form a given image on the recording paper by thermally transferring the corresponding part of a layer of ink formed in the inked film onto the recording paper in compliance with an image signal and, therefore, is adapted to generate heat in itself. Normally, therefore, the thermal transfer apparatus is provided with a cooling fan to be used for cooling the thermal head. Where the image projected on the display of the television receiver is formed onto a relatively small recording paper as in the video printer, the thermal transfer recording apparatus to be used is desired to be miniaturized or made small. When the recording paper is used in the form of separate sheets in the place of a continuous roll as disclosed in the aforementioned patent publication, the apparatus is required to be provided with a paper feeding cassette for accommodating such sheets of the recording paper and a discharge paper part for receiving and storing the sheets of the recording paper which have undergone the transfer operation. The idea of having these parts incorporated in the apparatus and, at the same time, effecting the aforementioned .cooling of the thermal head with a relatively small cooling fan, therefore, has proved to be impracticable because the reel holding parts mentioned above interfere with the flow of the cooling air.

SUMMARY OF THE INVENTION

It is an object of the present invention to provide a small thermal transfer recording apparatus which, owing to the improvement of the inked film cassette, enables the cooling air to be blown safely against the thermal head.

The salient feature of this invention consists in providing a thermal transfer recording apparatus so constructed that the inked film cassette guides the cooling air to the thermal head.

According to the present invention, there is provided a thermal transfer recording apparatus detachably incorporating therein an inked film cassette, which thermal transfer recording apparatus comprising: a main body of said apparatus including a holding part for accommodating said inked film cassette, a conveying mechanism disposed on one side relative to said holding part and adapted to convey a recording paper, a thermal head for transferring the ink on an inked film in said inked film cassette onto said recording paper being conveyed by said conveying mechanism, and a cooling mechanism disposed on the other side relative to said holding part and adapted to cool said thermal head by generating cooling air; and said inked film cassette including a supply reel for supplying said inked film, a takeup reel for taking up said inked film paid out of said supply reel, and a casing for accommodating said supply reel and said takeup reel; said casing being provided with a guide part for guiding said inked film between said two reels, a supply reel holding part disposed protrudingly on one side relative to said guide part, and a takeup reel holding part disposed protrudingly on the other side, and said guide part having formed therein an opening part for supplying said inked film for thermal transfer recording.

The inked film cassette of the present invention is so formed that the takeup reel holding part and the supply reel holding part fixed at the opposite ends of the cassette casing project in mutually opposite directions from the cassette casing.

DESCRIPTION OF THE PREFERRED EMBODIMENTS

Now, the present invention will be described in detail below with reference to working examples of the invention.

Figure 1:
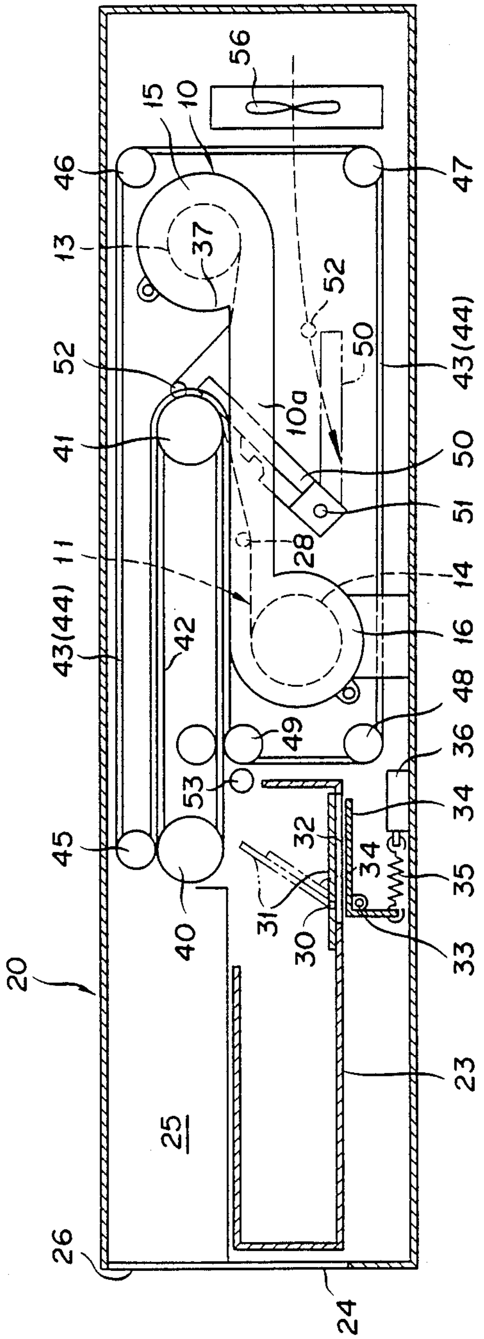
FIG. 1 is a cross section of a thermal transfer recording apparatus incorporating therein an inked film cassette as one embodiment of the present invention.
Figure 4:
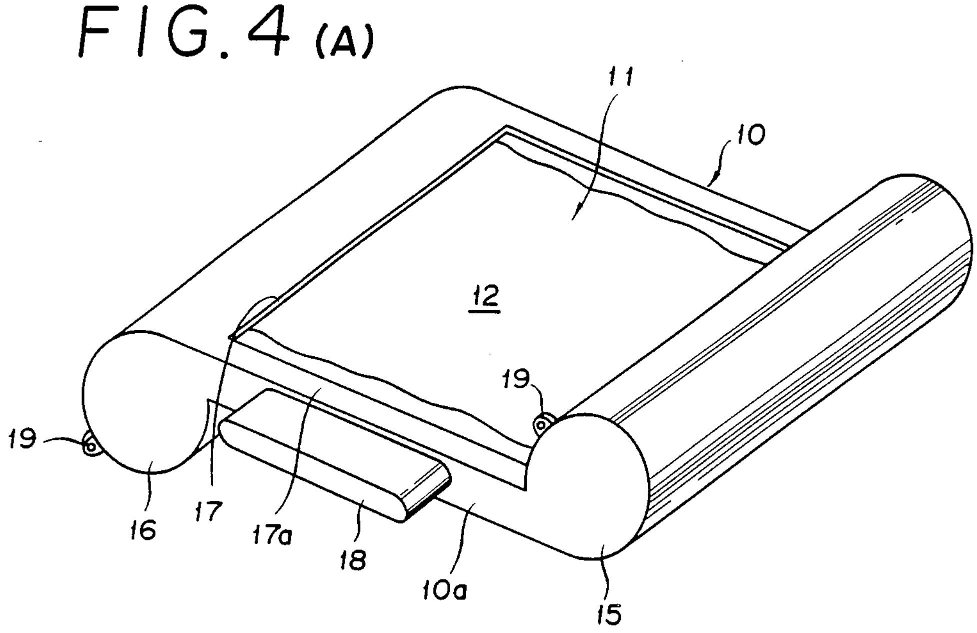
FIG. 4A is a perspective view illustrating the inked film cassette of FIG. 1.
FIGS. 4B, 4C, and 4D are perspective views illustrating other inked cassettes as other embodiments of this invention.
Figure 4:
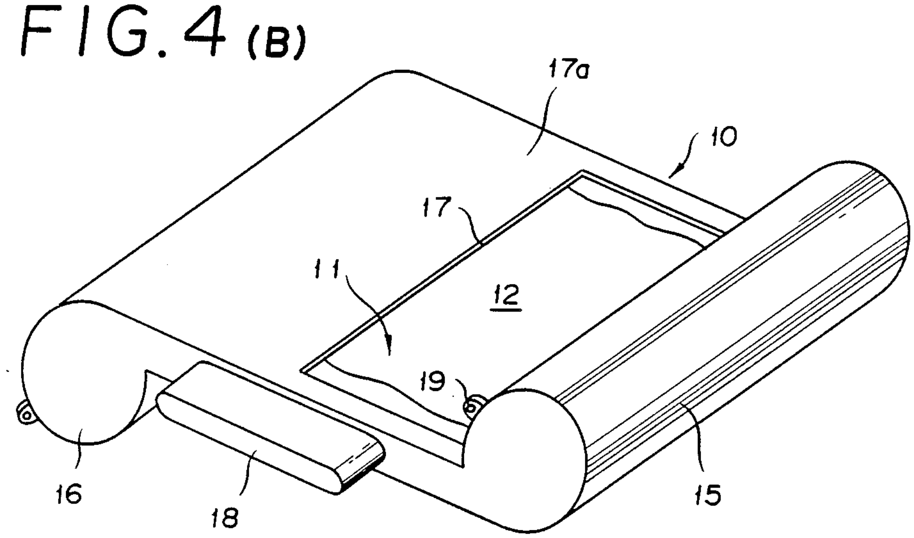

FIG. 1 is a cross section illustrating a thermal transfer recording apparatus incorporating therein an inked film cassette embodying the present invention and FIG. 4A illustrates an inked film cassette as one embodiment of this invention.

An inked film 11 in an inked film cassette 10 of the present invention is in the form of a strip having the leading end thereof wound around a takeup reel 13 through the medium of a heat transfer part 12 and the trailing end part thereof wound around a supply reel 14 as illustrated in FIG. 1. At one end of a cassette body or casing 10*a*, a takeup reel holding part 15 of a substantially tubular shape is formed as thrust on the upper surface side of the cassette casing 10*a* as illustrated in FIG. 4A. At the other end of the cassette casing 10*a*, a supply reel holding part 16 of a similarly substantially tubular shape is formed as thrust on the lower surface side of the cassette casing 10*a*. Thus, the takeup reel holding part 15 and the supply reel holding part 16 are disposed so as to be positioned on the mutually opposite sides, i.e. the obverse and reverse sides, of the cassette casing 10*a*. The cassette 10, in its front view, has a general shape of the letter S.

In the illustrated embodiment, the thermal transfer recording device is intended to form a color image on a recording paper. The inked film 11, therefore, has ink layers yellow, magenta, and cyan, and optionally black in color formed on a baselayer thereof. Each of the ink layers has a length slightly larger than the length of the recording paper. In an upper side wall part 17*a* forming part of the cassette casing 10*a*, an opening 17 is formed as illustrated in FIG. 4A. Similarly, in a lower side wall part forming part of the cassette casing 10*a*, an opening (now shown) is formed.

Figure 2:
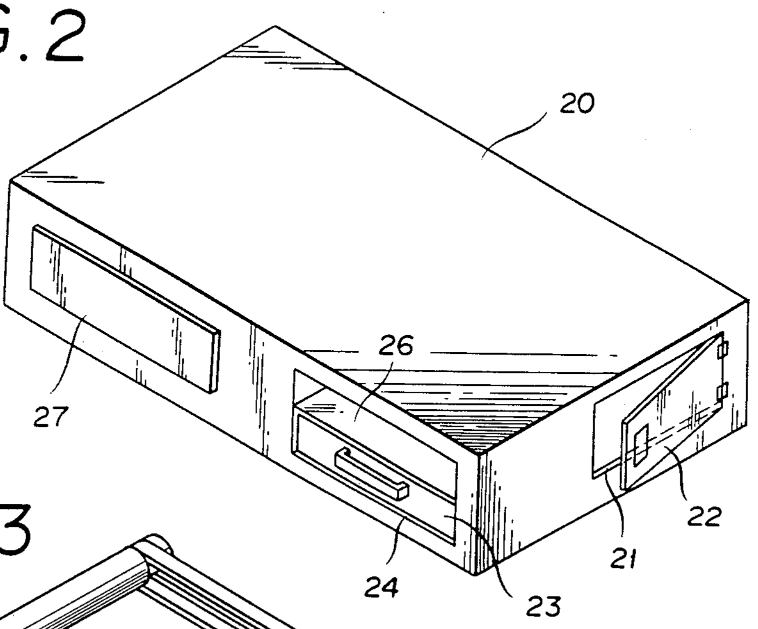
FIG. 2 is a perspective view illustrating in schematic form the overall outward appearance of the thermal transfer recording apparatus illustrated in FIG. 1.

The cassette 10 constructed as described above is set in place freely detachably inside a case 20 forming part of the thermal transfer apparatus body through a ribbon cassette inserting mouth 21 formed in the case 20 as illustrated in FIG. 2. This ribbon cassette inserting mouth 21 is fitted with an open-close lid 22 for opening and closing the ribbon cassette inserting mouth 21.

On the front part of the cassette 10, a handle part 18 is formed as illustrated in FIG. 4A. Further, a positioning part 19 is formed to permit insertion therethrough of a positioning pin (not shown) fixed inside the case 20 for the purpose of correctly locating the cassette 10 inside the case 20. For the handle part 18 to come into ample contact with the open-close lid 22, the handle part 18 is formed in a length roughly one half of the overall length of the cassette 10.

The recording paper used in the form of a separate sheet is otherwise called transfer paper, service paper, or recording sheet. The sheets of the recording paper are contained inside a supply paper cassette 23 as illustrated in FIGS. 1 and 2. This supply paper cassette 23 is detachably inserted into the case 20 through a service paper inserting mouth 24. Above the supply paper cassette 23, a paper discharging part 25 for receiving and holding recording papers which have undergone the transfer operation is disposed. The sheets of the recording paper which have undergone the recording are picked up by the operator through a paper discharging mouth 26 formed in the case 20. The reference numeral 27 shown in FIG. 2 denotes an operation panel, which is adapted to be fitted with switches (not shown) to be used in the operation of the thermal transfer apparatus. To the supply paper cassette 23, a service paper retaining member 31 for lifting the leading end of the recording paper is attached rotatably about a shaft 30 as the center as illustrated in FIG. 1. In the leading end part of the supply paper cassette 23, an opening part 32 is formed for the purpose of enabling the service paper retaining member 31 to be rotated about the shaft 30 as the center and causing the leading end part of the service paper retaining member 31 to be pushed up. Inside the case 20, a pushing member 34 is disposed rotatably around a shaft 33. To this pushing member 34, a drive member 36 such as a solenoid is connected through the medium of a spring member 35 for the purpose of enabling the leading end of the pushing member 34 to be elevated through the opening 32.

Figure 3:
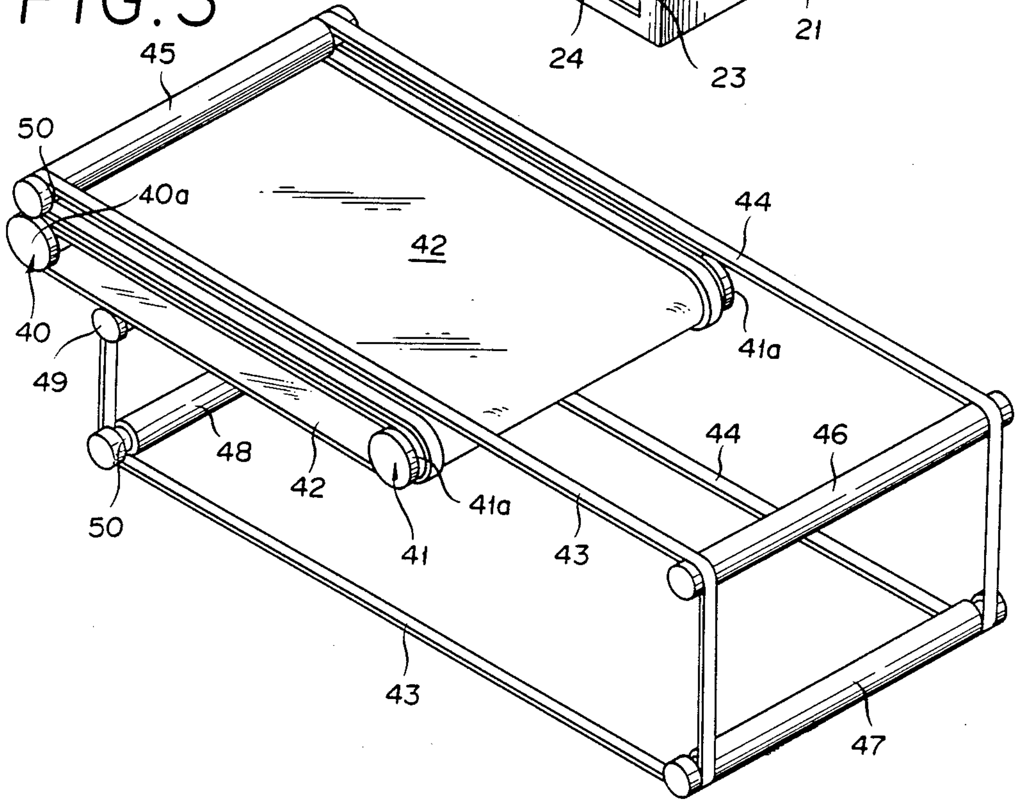
FIG. 3 is a perspective view illustrating in schema the state in which the belt illustrated in FIG. 1 is mounted.

A following roller 40 is fitted inside the case 20 as positioned above the leading end part of the supply paper cassette 23 inserted in the case 20. A driving roller 41 is disposed at a prescribed distance from the following roller 40. An endless platen belt 42 in the form of a flat sheet is passed around the rollers 40, 41 as illustrated in FIGS. 1, 3. To the driving roller 41 is connected a motor (not shown) which is adapted to drive the platen belt 42. On the rollers 40, 41, flanges 40*a*, 41*a* serving to support the opposite edges of the belt 42 are formed.

First and second endless conveyor belts 43, 44, each in the form of a cord, are disposed for the purpose of conveying the recording paper by utilizing the driving force of the platen belt 42. To suspend these conveyor belts 43, 44 in place, a guide roller 45 disposed continuously on the following roller 40, a guide roller 46 positioned on substantially the same level as the guide roller 45 at the right and end part inside the case 20 in the bearing illustrated in FIG. 1, and a guide roller 47 positioned below the guide roller 46 are fitted rotatably inside the case 20. Further, a guide roller 48 positioned on substantially the same level as the guide roller 47 substantially in the central part inside the case in the bearing illustrated in FIG. 1 and a guide roller 49 positioned above the guide roller 48 and adapted to contact the platen belt 42 are fitted rotatably inside the case 20. The two conveyor belts 43, 44 are passed around the guide rollers 45 to 49. In the opposite end parts of the rollers 45 to 49, annular grooves 50 for the conveyor belts 43, 44 are formed as illustrated in FIG. 3. Bearings are formed at the opposite ends of the rollers 40, 41, and 45 to 49. They are omitted from FIG. 3.

Of the two conveyor belts 43, 44, the portions from the guide roller 49 through the parts of the driving roller 41 to the guide roller 45 are allowed to contact the outer surface of the platen belt 42. When the platen belt 42 is driven by the driving roller 41, therefore, the drive belts 43, 44 are driven respectively by the portions of the conveyor belts 43, 44 which come into contact with the belt 42 mentioned above. By the motor which drives the driving roller 41, therefore, the two conveyor belts 43, 44 are operated in addition to the platen belt 42.

While the inked film cassette 10 is held inserted inside the case 20, this cassette 10 is positioned inside an accommodating space partitioned by the four guide rollers 46 to 49 and the driving roller 41. The upper side wall part 17*a* of the cassette casing 10*a* is positioned so as to come into substantial contact with the portions of the conveyor belts 43, 44 which extend between the guide roller 49 and the driving roller 41. Inside the cassette 10, a guide roller 28 is disposed as illustrated in FIG. 1 so that the inked film 11 paid out of the supply reel 14 is prevented from coming into contact with the end part of the cassette casing 10*a*.

Inside the case 20, the thermal head 50 for effecting the thermal transfer recording is fitted so as to be swung about a shaft 51 through the openings of the cassette casing 10*a* between the position of fast contact indicated by a solid line in FIG. 1 and the position of retraction indicated by an imaginary line. A separating roller 52 which is to be come into contact with the platen belt 42 through the medium of the inked film 11 as indicated by the solid line in FIG. 1 is disposed inside the case 20 so as to be swung synchronously with the thermal head 50 within the same range as that of the thermal head 50. While the inked film cassette 10 is being inserted into or removed from the case 20, the thermal head 50 is retracted in combination with the roller 52 to the position indicated by the solid line in FIG. 1. When the operation of thermal transfer is initiated after the insertion of the cassette 10, the leading end part of the thermal head 50 and the roller 52 pass through the opening parts 17 formed in the upper and lower wall parts of the cassette casing 10*a*, and, at the same time, press the inked film 11 against the portion of the platen belt 42 which wound around the driving roller 41.

To perform the operation of thermal transfer on the recording paper held inside the supply paper cassette 23, the drive member 36 is set in motion enabling the pushing member 34 to push up the service paper holding member 31 and the leading end part of the recording paper. As a result, the uppermost sheet of the recording paper inside the supply paper cassette 23 comes into contact with the belt 42. When the belt 42 is driven by the driving roller 41 in the present state, the recording paper is conveyed in the direction of the printing part. For the purpose of preventing two or more sheets of the recording paper to be simultaneously fed out in this case, a reversely riffling roller 53 is disposed on the left of the guide roller 49. This rerversely riffling roller 53 is connected to the driving roller 41 through the medium of a power transmission mechanism such as a belt or gears (not shown). This roller is adapted to be driven, similarly to the conveyor belts 43, 44, by the same motor which is intended to drive the driving roller 41. The fact that the motor for driving the driving roller 41 is adapted to drive not merely the platen belt 42 but also the conveyor belts 43, 44 and the reversely riffling roller 53 not only goes to lower the cost of the thermal transfer apparatus as a whole but also permits simplification of the construction of the apparatus. Optionally, these components may be adapted to be driven by separate motors.

The leading end of the pushing member 34 is elevated only when the operation of thermal transfer is started as described above for the following reason. Where a color image is to be formed on the recording paper with an inked film which is provided with ink layers of three colors, i.e. yellow, magenta, and cyan, for example, the recording paper is conveyed between the platen belt 42 and the conveyor belts 43, 44 to the position of the thermal head 50 and the yellow ink is transferred onto the recording paper before the recording paper is returned to permit transfer thereto of the magenta ink. To permit this return of the recording paper, the pushing member 34 is lowered in advance. This procedure similarly applies when the transfer of the cyan color is effected after the transfer of the magenta color is completed.

Since the belt 42 fulfills the function as a platen besides that for the conveyance of the recording paper, it must be capable of avoiding expansion or contraction while in motion lest it should induce a change in the speed of conveyance of the recording paper and consequently cause a misregister. This belt 42 is made of a rubber material such that the surface of the belt 42 retains desired flatness even when the pressure exerted during the thermal transfer falls in the range of 2 to 3 kg. Particularly, this belt 42 is desired to be made of an electroconductive material lest it should be electrified during the conveyance of the recording paper.

Figure 5:
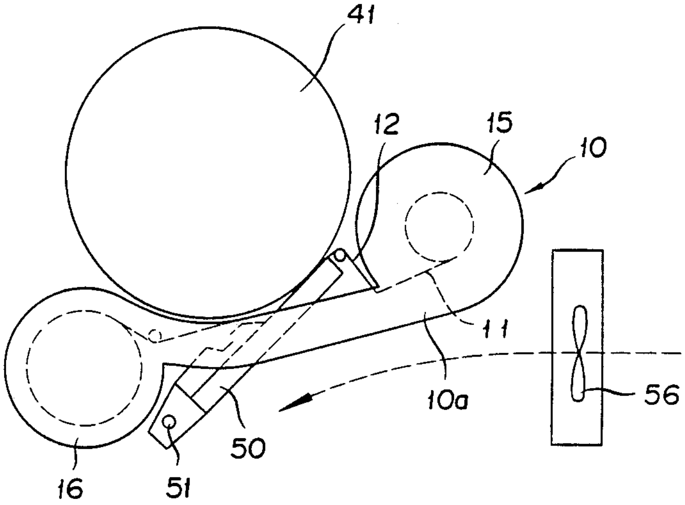
FIG. 5 is a magnified front view illustrating, in outline, the state in which an inked film cassette as another embodiment of the present invention is incorporated in the thermal transfer apparatus.

Inside the case 20, a cooling fan 56 for blowing cooling air in the direction of an empty space below the inked film cassette 10 is fitted as illustrated in FIG. 1. This cooling fan 56 is adapted to be driven by a motor not shown in the diagram. Since no obstacle stands in front of the cooling fan 56 as illustrated in FIG. 1 and FIG. 5, the cooling air blown out of the cooling fan 56 is directed safely toward the heat sink disposed in the thermal head 50. If the takeup reel holding part 15 is disposed below the cassette casing 10*a* to fall on the same side as the supply reel holding part 16 relative to the cassette casing 10*a* as in the conventional apparatus disclosed in the patent publication mentioned above, the takeup reel holding part 15 interfered with the flow of the cooling air from the cooling fan 56 and the cooling fan 56, therefore, is required to possess a large capacity. When the cassette 10 of a cross section of the letter S as contemplated by the present invention is incorporated in the thermal transfer apparatus, the takeup reel holding part 15 can not interfere with the flow of the cooling air and the thermal head 50 can be cooled infallibly by the small cooling fan 56.

When the cassette 10 of a cross section of the letter S is incorporated in the thermal transfer apparatus as described above, since the takeup reel holding part 15 is not positioned on the lower side, the interference between the thermal head 59 and the holding part 15 can be avoided by virtue of the limited space left inside the apparatus. In order words, this invention permits miniaturization of the apparatus as a whole while allowing an ample space for the movement of the thermal head 50.

Particularly since the interior of the thermal transfer apparatus is divided by the cassette 10 vertically into the upper side part and the lower side part, the cooling air from the cooling fan 56 is not dispersed inside the case 20 but is safely directed concentrically toward the thermal head 50.

To transfer a given color image on the recording paper with the thermal transfer recording apparatus described above, the supply paper cassette 23 holding the recording paper is inserted through the service paper inserting mouth 24 illustrated in FIG. 2 and set in place inside the case 20 and the inked film cassette 10 holding the inked film 11 is inserted through the cassette inserting mouth 21 and set in place within the case 20. While the cassette 10 is being set in place, the thermal head 50 has the leading end thereof turned downwardly and hung down as indicated by the imaginary line in FIG. 1.

When the operation of thermal transfer is started, the thermal head 50 is pressed in combination with the separating roller 52 against the driving side roller 41 through the medium of the belt 42 and the inked film 11 and the leading end of the service paper holding part 31 is raised by the drive member 36 and the uppermost sheet of recording paper within the supply paper cassette 23 is held in contact with the belt 42. When the driving roller 41 is rotated to set the belt 42 into motion, the recording paper is advanced toward the printing part as held in a state having the opposite ends thereof nipped between the belt 42 and the conveyor belts 43, 44. The timing for printing is controlled by the detection of the position of the recording paper by the sensor (not shown). First, the yellow color is transferred. When this operation is completed, the driving roller 41 is reversely rotated. At this time, the service paper holding part 31 is in a lowered state. The recording paper on which the yellow color has been transferred is returned to the fixed position and readied for the transfer of the magenta color and then the cyan color is repeated in the same manner as described above. The recording paper on which the transfer of all the colors has been completed is conveyed to the paper discharging part 25 by the platen belt 42 and the two conveyor belts 43, 44. During the course of the operation of thermal transfer, the thermal head 50 which has been heated is infallibly cooled by the cooling air supplied by the cooling fan 56.

The inked film 11 which has been used for the transfer of image is paid out of the supply reel 14 and wound around the takeup reel 13. In this case, since the takeup reel holding part 15 is disposed on the upper side relative to the cassette casing 10*a*, the inked film 11 is wound around the takeup reel 13 in such a manner that the ink layer formed thereon falls on the reverse side.

Figure 6:
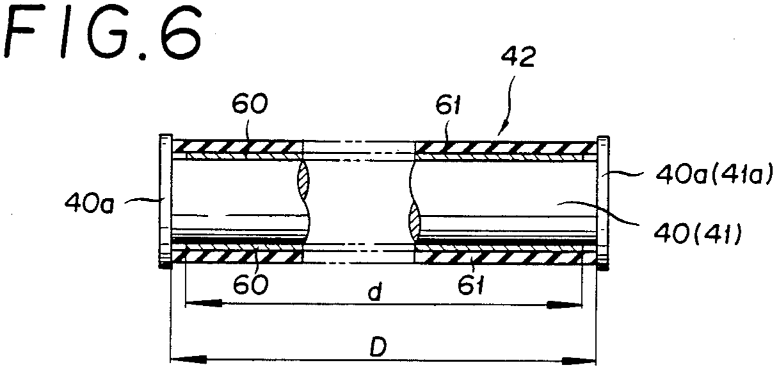
FIG. 6 is a cross section illustrating the construction of a belt as another embodiment of the present invention.

In the illustrated embodiment, the belt 42 is depicted as one made of rubber. It may be otherwise a fabric belt having a sheet of rubber applied to a fabric or a metallic belt having a sheet of rubber applied to a metallic base. When the metallic belt is used, a metallic base 60 has a thickness on the order of several um as illustrated in FIG. 6. When flanged rollers or pulleys are used for the conveyance of the belt 42, the end surfaces of the metallic base 60 come into contact with the flanges and sustain cracks possibly to an extent of shortening the service life of the belt 42. The width, D, of a surface layer part 41 made of rubber, therefore, is desired to be larger than the width, d, of the metallic base 60 as illustrated in FIG. 6.

In the embodiment described above, the upper and lower sections into which the interior of the apparatus is partitioned with the cassette 10 are utilized respectively for the recording paper conveying part and the printing part. Optionally, the vertical relationship of these two parts may be reversed as occasion demands. In the reversed relationship, the supply paper cassette 23 is positioned on a level higher than the paper discharging part 25. It is permissible to utilize the driving roller 41 as a platen roller, dispose another driving side roller on the left of the platen roller, and pass then belt 42 around the additional driving side roller and the following roller 40.

FIG. 5 is a diagram illustrating an inked film cassette 10 as another embodiment of the present invention. In this case, the cassette 10 is incorporated in an inclined posture in the thermal transfer apparatus as illustrated. When the driving roller 41 serving as a platen roller has a diameter larger than the diameters of the reel holding parts 15, 16, the inclination of the cassette 10 permits provision of an ample space for the movement of the thermal head 50.

FIG. 4B is a diagram illustrating an inked film cassette 10 as yet another embodiment of this invention. The opening 17 for thermal transfer in this embodiment has a smaller surface area than that of the embodiment of FIG. 4A and the portion of the cassette 10 forming the upper wall of the cassette casing 10*a* is adapted to guide the supply paper. The recording paper conveyed between the belt 42 and the conveyor belts 43, 44 to the portion of the cassette 10 corresponding to the cassette casing 10*a* has only the opposite side parts of the lower surface thereof supported on the conveyor belts 43, 44 and, therefore, has the possibility of causing the phenomenon of sagging This phenomenon of sagging can be perfectly prevented by using the cassette illustrated in FIG. 4B. The cassette 10 of the present invention is capable of forming a monochromic image as well as a color image. In the formation of a monochromic image by the use of the cassette 10 illustrated in FIG. 4A, the inked film 11 itself is capable of guiding the recording paper because the recording paper is not required to reciprocate its motion. This fact holds good also in the case of the cassette illustrated in FIG. 4B.

Figure 4C:
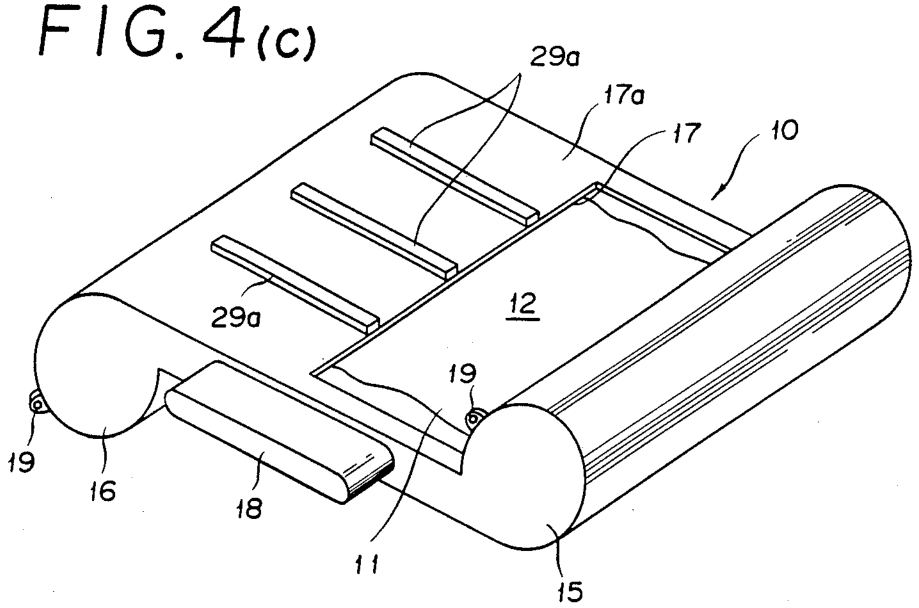
Figure 4D:
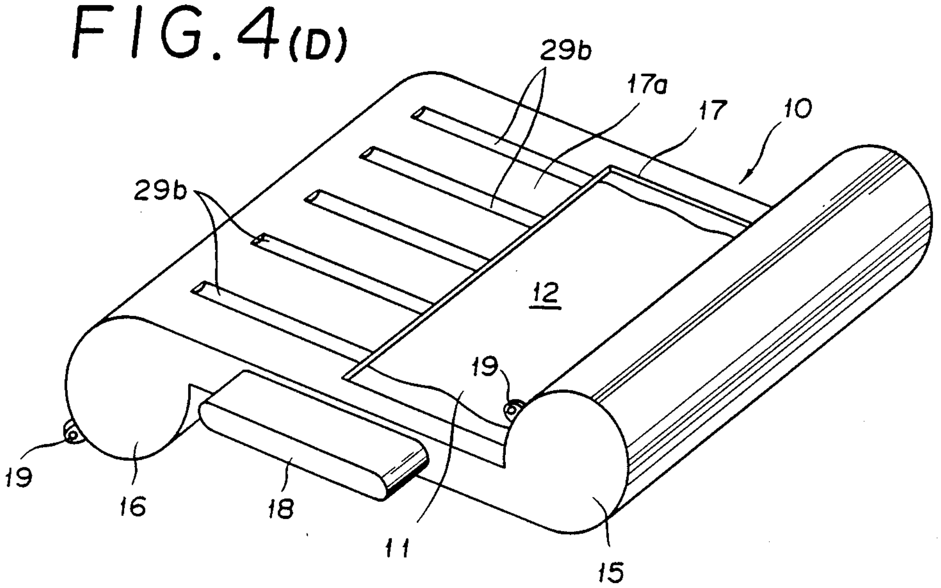

FIG. 4C and FIG. 4D are diagrams illustrating inked film cassettes 10 as still other embodiments of the present invention. In the cassette 10 illustrated in FIG. 4C, a plurality of protuberances 29*a* are disposed on the upper surface of the upper wall part 17*a* of the cassette casing 10*a* along the direction of conveyance of the recording paper. In the cassette 10 illustrated in FIG. 4D, a plurality of grooves 29*b* are formed similarly. The protuberances or grooves serve the purpose of ensuring effective conveyance of the inked film 11 without entailing lateral slip of the recording paper on the upper side wall part 17*a* of the cassette body 10*a*.

In FIG. 1, the reference numeral 37 denotes the portion of the cassette casing 10*a* which corresponds to the takeup reel holding part 15 side edge of the opening 17. The inked film 11 which has fulfilled the work of printing comes into contact with this portion 37. This portion 37 may be furnished with a roller .or a rounded corner (R) for preventing the film 11 from being fractured or stretched ununiformly because of contact therewith.

What is claimed is:

1. A thermal transfer recording apparatus detachably incorporating therein an inked film cassette, which thermal transfer recording apparatus comprises:

- a main body of said apparatus including means for accommodating said inked film cassette;
- a conveying mechanism disposed on one side of said accommodating means to convey a recording paper;
- a thermal head for transferring the ink on an inked film onto said recording paper being conveyed by said conveying mechanism; and
- a cooling mechanism disposed on the other side of said accommodating means for cooling said thermal head;
- said inked film cassette including a supply reel for supplying said inked film, a takeup reel for taking up said inked film paid out of said supply reel and a guide part for guiding said inked film between said two reels wherein said supply reel and said takeup reel are protrudingly disposed relative to said guide part with each of said reels protruding from said guide part in opposite directions relative to one another;

said guide part having formed therein an opening for exposing said inked film for thermal transfer recording, said cooling mechanism including means for forming a flow of air toward said thermal head along said guide part from the side where the protruded one of said reels is in a position not interfering with the flow of air.

2. The thermal transfer recording apparatus as claimed in claim 1, wherein said thermal head is pivotally provided for contact with and out of contact with the inked film for transfer of the ink and is pivotable at a position close to the other one of said reels.

3. The thermal transfer recording apparatus as claimed in claim 1, wherein said guide part is associated with said conveying mechanism for guiding said recording paper fed by said covering mechanism.

4. The thermal transfer recording apparatus as claimed in claim 3, wherein said conveying mechanism includes a paper guiding means for guiding the recording paper between said paper guiding means and said guide part.

5. A thermal transfer recording apparatus, comprising:

a main body of said apparatus having a first and a second surface substantially parallel to each other with a predetermined distance therebetween;

a thermal head;

a detachable inked film cassette accommodated between said first and second surfaces, and including a supply reel for supplying said inked film, a takeup reel for taking up said inked film paid out of said supply reel, and a guide part between said reels, wherein said supply reel and said takeup reel are protrudingly disposed relative to said guide part with each of said reels protruding from said guide part in opposite directions relative to one another, said guide part having formed therein an opening for exposing said inked film for thermal transfer recording, said guide part being substantially parallel to said first and second surfaces, said distance between said surfaces being substantially the same as the total distance of both protrusions of said reels;

a cooling mechanism for cooling said thermal head by generating cooling air and forming a flow of air toward said thermal head from the side of the cassette where the protruded one of said reels is in a position not interfering the flow of air; and a conveying mechanism for transporting recording paper provided at a side where the other one of said protruded reels is provided but opposite of said other one of protruded reels relative to said guide part.

6. The thermal transfer recording apparatus as claimed in claim 5, wherein said thermal head is pivotally provided for contact with and out of contact with the inked film for transfer of the ink and is pivotable at a position close to the other one of said reels.

7. A thermal transfer recording apparatus, comprising:

a main body of said apparatus including a paper conveying mechanism for conveying a recording paper;

a thermal head for transferring the ink on an inked film onto said recording paper;

a cooling mechanism for cooling said thermal head by cooling air; and a detachable inked film cassette including a supply reel for supplying said inked film, a takeup reel for taking up said inked film paid out of said supply reel, and a guide part for guiding said inked film between said two reels, said supply reel and said takeup reel being protrudingly disposed relative to said guide part with each of said reels protruding from said guide part in opposite directions relative to one another, and said guide part being associated with said paper conveying mechanism to form a transport path for said recording paper, said conveying mechanism being disposed at a side of said cassette where one of said reels is provided but on the opposite side of said one of the reels relative to said guide part.

8. A thermal transfer recording apparatus, comprising:

an inked film cassette including a first reel for paying out the inked film and a second reel for winding the same, said cassette including a first protruded portion where said first reel is provided and a second protruded portion where said second reel is provided, wherein said first protruded portion is protruded in a first direction and said second protruded portion is protruded in a second direction which is opposite to the first direction, said cassette further including a guide portion bridging said first and second protruded portions through which guide portion the inked film is transported, said guide portion having an opening formed therein;

means for transporting a recording paper over said guide portion and at a side of said cassette where said first protruded portion is provided but at the second direction side which is opposite to the first protruded portion relative to said guide portion;

thermal transfer means including a thermal head and being pivotable at a position close to said first protruded portion to move through said opening to transfer the ink of the inked film onto the recording paper; and air cooling means for forming a flow of air toward said thermal transfer means, said flow of air forming a path from a side of said cassette where said second protruded portion is provided but at the first direction side which is opposite to the second protruded portion relative to said guide portion.

9. A thermal transfer recording apparatus, comprising:

a main body of said apparatus having a first surface and a second surface substantially parallel to each other with a predetermined distance therebetween;

an inked film cassette accommodated between said first and second surfaces including a first reel and a second reel, one of said reels pays out the inked film while the other reel winds the same, said cassette including a first protruded portion wherein said first reel is provided and a second protruded portion wherein said second reel is provided, said first protruded portion being protruded in a first direction and said second protruded portion being protruded in a second direction which is opposite to the first direction, said cassette further including a guide portion bridging said first and second protruded portions through which the inked film is transported, said guide portion having an opening formed therein and being parallel to said first and second surfaces, and said predetermined distance between said surfaces being substantially same as the sum of the protrusions of said reels;

means for transporting a recording paper over said guide portion and at a side of the cassette where said first protruded portion is provided but at the second direction side which is opposite to the first protruded portion relative to said guide portion;

thermal transfer means for transferring ink from the inked film onto the recording paper; and air cooling means for forming a flow of air toward said thermal transfer means, said flow of air forming a path from a side of the cassette where said second protruded portion is provided but at the first direction side which is opposite to the second protruded portion relative to said guide part.

* * * * *